No. 754,969. PATENTED MAR. 22, 1904.
M. C. BURT.
STORAGE BATTERY.
APPLICATION FILED AUG. 13, 1903.
NO MODEL. 2 SHEETS—SHEET 1.
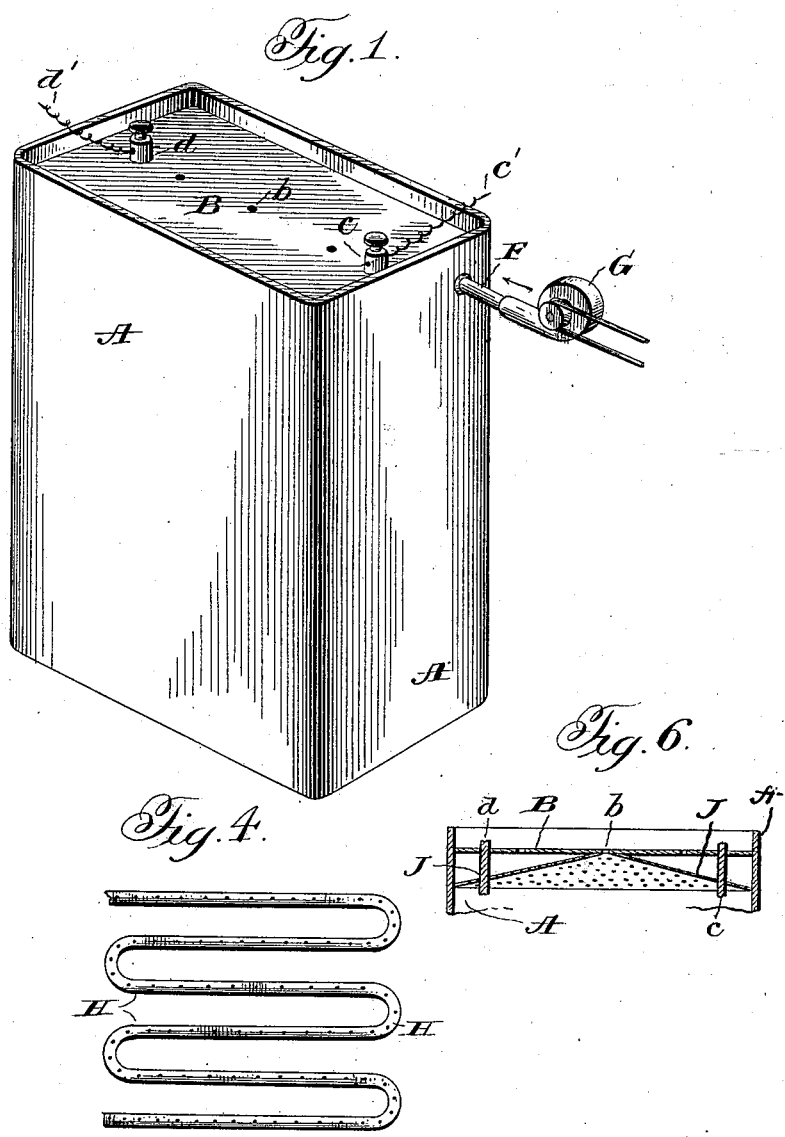
Witnesses:
Jas E Hutchinson
D. W. Gibbs
Inventor:
Martin C. Burt No. 754,969. PATENTED MAR. 22, 1904.
M. C. BURT.
STORAGE BATTERY.
APPLICATION FILED AUG. 13, 1903.
NO MODEL. 2 SHEETS—SHEET 2.
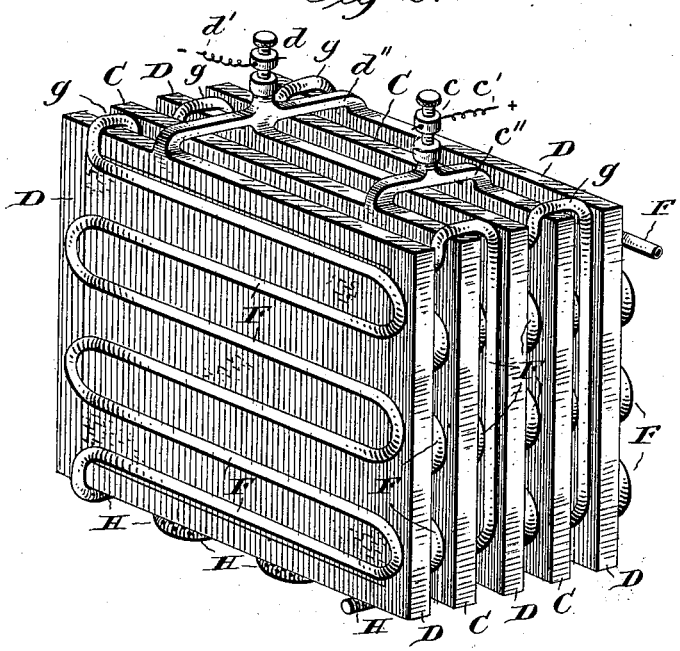
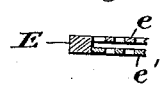
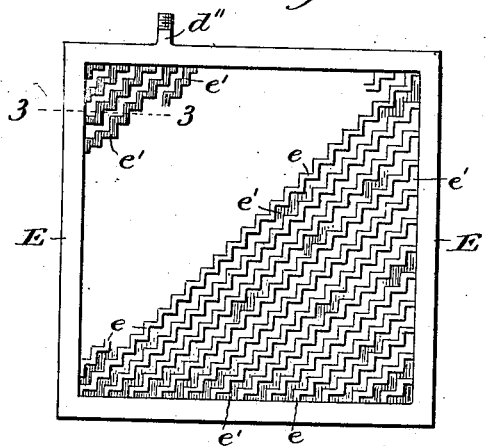
Witnesses:
Jas Es Hutchinson
D. W. Gibbs.
Inventor:
Martin C. Burt No. 754,969.

Patented March 22, 1904.

UNITED STATES PATENT OFFICE.

MARTIN C. BURT, OF CHICAGO, ILLINOIS.

STORAGE BATTERY.

SPECIFICATION forming part of Letters Patent No. 754,969, dated March 22, 1904.

Application filed August 13, 1903. Serial No. 169,348. (No model.)

*To all whom it may concern:*

Be it known that I, MARTIN C. BURT, a citizen of the United States, residing at Chicago, in the county of Cook and State of Illinois, have invented certain new and useful Improvements in Storage Batteries, of which the following is a specification, reference being had therein to the accompanying drawings.

This invention relates to novel improvements in electric storage batteries, and has for its primary object the provision of a cell provided with cooling instrumentalities designed to overcome or counteract the heat within the cell created ordinarily by the internal resistance therein.

The invention also contemplates a cooling device for the purpose designated possessing certain structural characteristics which permit the same when the device is properly applied and in use to serve other useful and important functions.

The novel details in the construction and arrangement of the several parts of the cell will be apparent from the detailed description hereinafter when read in connection with the accompanying drawings, forming a part hereof, and wherein a convenient embodiment of the invention is shown. It is, however, to be understood that the disclosures herein made are simply for the purpose of facilitating a full understanding of the invention, and, further, that in any future interpretation as to the scope of the invention the same is not to be limited to any special features of structure, excepting so far as any such may be positively included in the hereto-appended claims.

In the drawings, Figure 1 is a battery-cell constructed in accordance with the present invention. Fig. 2 is a perspective view of the same with the jar or casing removed. Fig. 3 is an elevation of one of the plates or grids. Fig. 4 is a detail fragmentary view. Fig. 5 is a cross-sectional view on the line 3 3 of Fig. 3, and Fig. 6 is cross-section of the upper portion of the jar or casing.

Referring more specifically to the drawings, wherein like reference characters refer to corresponding parts in the several views, A designates a jar or casing of any well-known or desirable material provided with a cover B, through which pass the binding-posts $c$ and $d$ for the wire-terminals $c'$ and $d'$, said cover also having outlet-apertures $b$ for the escape of the gases generated within the cell.

C and D designate, respectively, the positive and negative plates, there being one more negative plate than the positive plates to permit of the utilization of both surfaces of the latter, as is usual. The plates are preferably formed of a frame E, provided with a series of parallel stepped bars $e$, extending across one face of the frame, and a second series $e'$, extending across the opposite face thereof, both series being alike, but so arranged that the bars of one series are staggered relative to the bars of the other series—that is, the bars of the rear series are positioned so as to be opposite the spaces intermediate the bars of the forward series, and vice versa. The utility of this style of plate is obvious, in that its large capacity and facilities for the retention of the active material are marked.

F is a pipe which passes through an opening in one side of the jar or casing provided for the purpose, and is bent so as to pass in adjacence to the surface of and between the plates, said pipe being of any suitable insulated material and adapted to conduct air under pressure around and beneath said plates to counteract the heat in the cell resultant from the internal resistance, as hereinbefore referred to, the pressure for driving the air through said pipe being created through the medium of a pump, fan, or other equivalent means, (designated at G,) which may be operated from any suitable source of power—as, for instance, in connection with cells making up a battery for vehicle purposes, when the blower may be coupled with any moving part of the vehicle. It will be observed that the pipe under consideration on the interior of the cell is formed in coils arranged transversely or longitudinally, as the case may be, of the plates, one series of parallel coils being interposed between each pair of plates and also upon the outer surface of the outside plates, the adjoining series of coils being connected over the upper edges of the plates at alternate ends thereof by bends $g$. The lowermost end of the last series of coils, at the side of the casing opposite to the pipe-inlet, is connected to a bottom coil H, the straight parallel portions of which are arranged to directly underlie and cross the lower edges of all of the plates, so as to support the same thereon. The pipe, if found expedient, may be perforated throughout its entire extent; but I prefer that the bottom series only be provided with minute apertures for the escape of the air and that the other portions of the pipe be imperforate. In this manner a double cooling effect is attained, inasmuch as the cold air initially passing through the pipes will cool the same, the influence of which will of course be radiated throughout the cell, and the air finally escaping in an even gradual manner through the bottom coils will bubble up through the electrolyte to the top of the receptacle, thereby imparting an additional cooling action. It is further to be noted that the arrangements of the coils are such as to not only perform the function just stated, but, in addition thereto, the intermediate series efficiently act as separators to prevent the plates coming in contact and cross-circuiting; also, the bottom series of coils maintains the plates at a sufficient elevation from the bottom of the jar or casing to prevent any short-circuiting which might otherwise be due from the falling of particles of active material to said bottom, and, finally, the plates are separated and held in proper relation to each other.

While the pipe F is shown as bent in a practical and preferred manner, it is obvious that the same may be bent or fashioned in a number of ways not necessary to illustrate herein to accomplish all or any of the purposes defined.

The gases generated within the cell rise to the top thereof, but owing to the restricted character of the discharge-openings said gases do not all escape, and inasmuch as an accumulation of the gases is objectionable provision is made for the forcible expulsion of the same. This means is the air which bubbles up from the electrolyte into the upper part of the jar or casing, and the gases being somewhat lighter than the air under pressure they arise uppermost and are duly ejected. A perforated inverted hood or baffle J, approximately funnel-shaped, is interposed between the outlet-apertures b in the top and the interior of the casing A, whereby the rising gases impacting against said baffle are broken thereby, so as to escape in jets through the plurality of apertures therein, and subsequently are permitted a limited expansion previous to their final escape, thus enabling a speedy relief of the same.

The force of the air in the pipe or conductor F is just sufficient to overcome the pressure of the liquid within the jar or casing, and is not strong enough to create any perceptible or injurious disturbance in the electrolyte.

The positive and negative plates may be connected in series in any desirable manner, the means shown being bridges $c''$ and $d''$, respectively, in electrical communication with the binding-posts $c$ and $d$.

It is to be understood that while I have used in the claims the specification of "air" as the cooling agent the same is not intended as a limitation, as it is obvious that other cooling mediums may be employed in lieu thereof; also, that where the term "open conductor" is used the same is to convey the meaning that the conductor opens to the interior of the cell, whereby the cooling medium is liberated therein, so as to intermingle with the electrolyte.

Having thus described the invention, what is claimed as new, and desired to be secured by Letters Patent, is—

1. In a battery-cell, positive and negative plates, in combination with cooling instrumentalities comprising an air-conductor arranged between said plates, and means for forcing air through said conductor.

2. In a battery-cell, positive and negative plates, in combination with cooling instrumentalities comprising a coiled pipe arranged between said plates, and means for forcing air through said pipe.

3. In a battery-cell, positive and negative plates, in combination with cooling instrumentalities comprising an air-conductor arranged between said plates and also outside of the same, and means for forcing air through said conductor.

4. In a battery-cell, positive and negative plates, in combination with cooling instrumentalities comprising a coiled pipe arranged between said plates and also outside of the same, and means for forcing air through said pipe.

5. In a battery-cell, positive and negative plates in combination with cooling instrumentalities comprising an air-conductor arranged between, at the sides of, and beneath said plates, and means for forcing air through said conductor.

6. In a battery-cell, positive and negative plates, in combination with cooling instrumentalities comprising a coiled pipe arranged between, at the sides of, and beneath said plates, and means for forcing air through said pipe.

7. In a battery-cell, positive and negative plates, in combination with means for elevating the plates above the bottom of the cell comprising a coiled pipe underlying the under edges of the plates.

8. In a battery-cell, positive and negative plates, and cooling instrumentalities comprising a perforated pipe arranged in adjacence to said plates, and means for forcing air through said pipe.

9. In a battery-cell, positive and negative plates, and cooling instrumentalities comprising a coiled perforated pipe arranged in adjacence to said plates, and means for forcing air through said pipe.

10. In a battery-cell, positive and negative plates, and cooling instrumentalities comprising a perforated pipe underlying said plates, and means for forcing air through said pipe.

11. In a battery-cell, positive and negative plates, and cooling instrumentalities comprising a coiled perforated pipe underlying said plates, and means for forcing air through said pipe.

12. In a battery-cell, positive and negative plates, in combination with cooling instrumentalities comprising a coiled pipe arranged between, at the sides of, and beneath said plates, and means for forcing air through said pipe, that portion of the pipe underlying the plates being perforated.

13. In combination with a battery-cell, cooling instrumentalities comprising an open air-conductor, and means operatively associated therewith for forcing air through said conductor and into the electrolyte of the cell.

14. In combination with a battery-cell, cooling instrumentalities comprising an open air-conductor, and means operatively associated therewith for forcing air through said conductor and into the electrolyte of the cell, said cell being provided with an outlet for said air at the upper portion thereof.

15. In combination with a battery-cell, cooling instrumentalities comprising an open air-conductor, and means operatively associated therewith for forcing air through said conductor and into the electrolyte of the cell, said cell being provided with an outlet for said air and the gas expelled thereby at the upper portion thereof.

16. In combination with a battery-cell, cooling instrumentalities comprising an open air-conductor, and means operatively associated therewith for forcing air through said conductor and into the electrolyte of the cell, said cell being provided with an outlet for said air and the gas expelled thereby at the upper portion thereof, and a perforated hood or baffle between said outlet and the interior of the cell.

17. In combination with a battery-cell, means for forcibly expelling the gases therefrom.

18. In combination with a battery-cell, means for forcibly expelling the gases therefrom comprising an open air-conductor leading into the interior of said cell, and means for forcing air through said conductor.

19. In combination with a battery-cell, means for forcibly expelling the gases therefrom and a perforated hood or baffle into which the gases pass previous to their discharge.

20. In combination with a battery-cell, means for forcibly expelling the gases therefrom comprising an open air-conductor leading into the interior of said cell, means for forcing air through said conductor, and a perforated hood or baffle into which the gases pass previous to their discharge.

In testimony whereof I affix my signature in presence of two witnesses.

MARTIN C. BURT.

Witnesses:
Thos. R. Heath,
Edward H. Young.